Sept. 22, 1959   J. E. HANSEN   2,905,774
ELECTRICAL CONTACTING DEVICE
Filed Aug. 1, 1957   2 Sheets-Sheet 1

INVENTOR.
JULIAN E. HANSEN
BY
ATTORNEY

United States Patent Office 2,905,774
Patented Sept. 22, 1959

2,905,774
ELECTRICAL CONTACTING DEVICE

Julian E. Hansen, San Diego, Calif., assignor to General Dynamics Corporation, San Diego, Calif., a corporation of Delaware Application August 1, 1957, Serial No. 675,750

6 Claims. (Cl. 200—11)

The present invention relates to a variable electric contact device and more particularly to a variable electric contact device which utilizes a precessing current collector to reduce contact wear.

Generally, variable electric contact devices such as potentiometers, commutators, stepping switches and the like utilize a current collector or wiper that slides across the face of the contact member and results in rapid wear of both the contact member and current collector. Quite often a considerable amount of heat is generated and the contact elements may be carbonized as a result. There are some devices that use a current collector attached to an obliquely cranked shaft to obtain a precessing current collector which presses against the contact members instead of wiping them and thus reduce contact wear. These devices use springs to create the desired contact pressure between the current collector and contact member. Also, since an obliquely cranked shaft is used, shaft supports are needed on both sides of the current collector. In addition to this, the bulk and mass of these devices results in a considerable inertia load on the shaft when said shaft is rotated. At high rates of rotation the oblique portion of the shaft and attached current collector, springs, spring plate, bearings and the like may cause considerable dynamic unbalance resulting in shaft support chatter and wear. These devices require that the shaft be positioned through an aperture in the contact member, thus limiting their application. All of the above devices are unsuitable for use in printed circuits because they either rapidly wear the printed circuit away or wipe it off the circuit board entirely.

The present invention is a variable electric contact device in which the current collector is eccentrically and loosely mounted on the end of a shaft in a manner that causes the collector to precess around its contact with a contact member when the shaft is rotated. This is done by an off-set mounting of the collector from the axis of the shaft and tilting the collector so that its axis is angularly disposed with respect to the axis of the shaft. The collector has a contact surface which rolls on the contact member synchronously with the angular velocity of the shaft, making contact with the contact member without slipping in an angular direction. The difference in contact path length between the contact surface and collector contacting surface causes the collector to rotate slightly with each revolution of the shaft and associated rolling contact position. However, there is no angular frictional movement to cause heating and attendant carbonizing of contact elements. The current collector acts as a spring itself to produce contact pressure, thus eliminating the use of external springs. The radial corrugations of the thin resilient collector permits a very small radial movement of the collector at the point of contact to insure good clean contacting surfaces. Also, an obliquely cranked shaft and the extra supports required in the use of such a shaft, as heretofore used, are eliminated and the inertia load on the shaft is reduced by the use of this simpler, lighter, more inexpensive device. In addition, this device is not limited to applications where the shaft is positioned through an aperture in the contact member. As a result of the advantages cited above, this invention can be used with printed circuits as well as ordinary potentiometers, commutators, stepping switches and the like.

It is, therefore, an object of this invention to provide a variable electric contact device in which contact wear is almost completely eliminated.

Another object is to provide a variable electric contact device that may be used with printed circuitry acting as one of the two contact elements.

Another object is to provide an electric contact device wherein a current collector precesses about the axis of the shaft on which said current collector is mounted.

Another object is to provide a variable electric contact device in which the current collector itself functions as a spring to produce contact pressure.

Another object is to provide a variable electric contact device in which the angular position of a shaft prescribes the point of contact between a current collector and a contact member.

Other objects and features of the present invention will be readily apparent to those skilled in the art from the following specification and appended drawings wherein is illustrated a preferred form of the invention, and in which.

Figure 1:
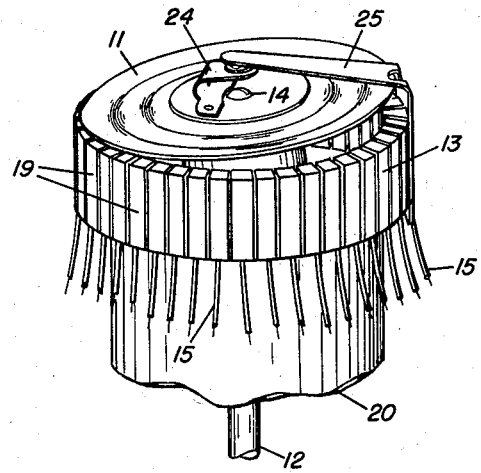
Figure 1 is a fragmentary perspective view of a preferred embodiment of the instant invention.

The preferred embodiment shown in Figure 1 utilizes a thin, round, corrugated, flexible, spring-like conductive current collector 11 mounted loosely and eccentrically on the end of the shaft 12. The contact member 13 is a commutator ring comprised of equal size segments 19 insulated from each other by air gaps or insulative material. Suitable leads 15 interconnect the various segments to external circuitry as desired. Contact member 13 is supported in position by some suitable means, such as the cylindrical member 20, for example. The shaft 12 is shown positioned through an aperture in the commutator ring but this configuration is not essential to the operation of the present invention. This is borne out by the embodiment shown in Figure 4 which is one alternate configuration that could be used with a commutator ring.

Figure 2:
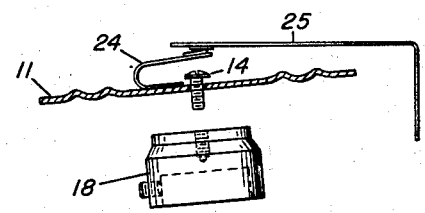
Figure 2 is an exploded cross sectional view of the current collector assembly.

The exploded cross sectional view of the preferred embodiment illustrated in Figure 2 shows the shaft 12 to be press fitted into an angle-drilled bushing 16. The bushing is split along its axis for expansion purposes. A small ball bearing 26 is recessed into the shaft and a screw 23 is used to force the ball bearing outward after assembly. A ball bearing sleeve 17 is placed over the split bushing and the screw 23 is tightened. This forces the small ball bearing 26 out against bushing 16 and produces a tight fit between the shaft 12, bushing 16 and the inner race of the ball bearing sleeve 17. An insulating bushing 18 is then pressed over the outside of the ball bearing sleeve to prevent current leakage from the collector 11. The current collector disc 11 is attached to the insulating bushing 18 by a screw 14. A pick-off spring or brush 24 is secured to the top of the collector and is used to make electrical contact with the arm 25 throughout movement of the collector. The collector is preferably of a resilient material having annular spring like corrugations such that when pressure is exerted upwardly along one portion of the edge, as by contact with the contact member 13 for example, that portion will move somewhat outwardly in a slight radial motion. This provides a small cleaning action movement which insures good electrical contact. This type of assembly of bushings, bearings, shaft and collector results in a unique mode of variable electric contact operation which will now be described.

A voltage is applied to arm 25 by some means. It is desired to transfer this voltage to the segments 19 of the commutator ring 13 shown in Figure 1. The pick-off brush 24 transmits the voltage from the arm 25 to the collector. As the shaft 12 rotates the current collector precesses about the axis of the shaft, moving from one commutator segment to another at shaft rotation speed and thus transmitting the voltage to first one and then another commutator segment. A current lead 15 is attached to each segment and this transmits the voltage appearing on a segment to the desired external electrical circuit.

Figure 3:
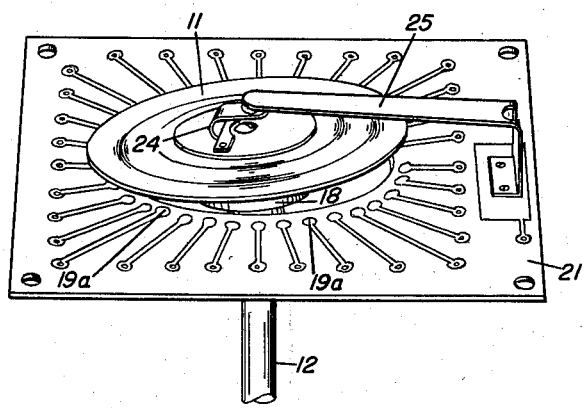
Figure 3 shows an embodiment of this invention which utilizes printed circuitry for one contact element.

In Figure 3 the current collector assembly is substantially the same as that shown in Figure 2. Brush 24 provides electrical continuity between the collector 11 and arm 25 throughout movement of the collector. Commutator contacts 19A, however, are formed by using printed circuit techniques well known in the art. Since the collector does not wipe the segments, but instead presses against them with a slight radial cleaning movement, the segments are long lasting. The printed circuit configurations on the circuit board 21 demonstrate that various of the segments may be connected together as desired.

Figure 4:
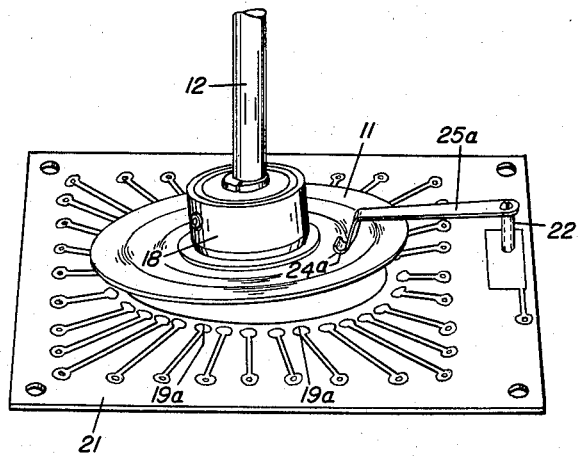
Figure 4 shows another embodiment of this invention which utilizes printed circuitry for one contact element.

In Figure 4 the collector assembly does not extend through the plane of the contacts 19A so that no opening in the circuit board 21 is necessary. Here arm 25A is spring urged downwardly and mounted on a post 22. End 24A engages collector 11 at all times such that there is electrical continuity from arm 25A to at least one of the several contacts 19A.

The flexibility of the current collector assists in causing a very slight radial sliding motion at the point of contact between the collector and commutator ring. This sliding motion will help keep the contact surfaces clean. The sliding motion may be changed by changing the shape and/or location of the corrugations in the current collector. Also, the mounting hole through the current collector can be made off center to modify the rotating contact pattern. In addition, the edge of the current collector can be made rigid or flexible to establish the area of the surface in contact. The amount of rotation imparted to the current collector 11 by the shaft 12 is dependent on the above disclosed features and the acute angle between the current collector 11 and shaft 12. The angular position of the shaft dictates the commutator segment that is contacted by the current collector whether the current collector rotates or not.

It should be noted that it is the relative rotation between the shaft and contact member that is important. The same results would be achieved were the shaft held stationary and the contact member rotated, for in either case the motion of the collector relative to the contact member is the same. The current collector used in the preferred embodiment is not the only form that may be used in this invention, for different applications may prescribe different types of current collectors.

The present invention may also be used to transmit voltages from the contact member to the current collector so, in an embodiment where a plurality of segments and voltages are used, the point of contact determines what voltage is transmitted to the collector. This invention can be used then to select an input or output voltage which will be transmitted to the collector pick-off brush by rotating shaft 12 in a predetermined manner.

While certain preferred embodiments of the invention have been specifically disclosed, it is understood that the invention is not limited thereto as many variations will be readily apparent to those skilled in the art and the invention is to be given its broadest possible interpretation within the terms of the following claims:

What I claim is:
1. An electric contact device comprising a rotatable shaft, a bushing on said shaft having an end surface whose plane is angularly disposed from the plane of rotation of said rotatable shaft, a collector rotatably mounted on said bushing, the plane of rotation of said collector being parallel to said end surface plane, a contact member having a plane normal to the axis of said shaft and positioned to contact said collector throughout movement thereof.

2. An electric contact device comprising a rotatable shaft, a collector, bushing and bearing means for rotatably mounting said collector to said shaft with the axis of said collector angularly disposed with respect to the axis of said shaft, a contact member positioned to contact said collector throughout relative movement therebetween, said collector precessing about the axis of said shaft and in engagement with said contact member upon rotation of said shaft.

3. An electric contact device comprising a rotatable shaft, a collector, an angle-drilled bushing on said shaft, said collector being rotatably mounted on said bushing, the axis of said collector being angularly disposed with respect to the axis of said shaft, a contact member positioned to contact said collector throughout relative movement therebetween, said collector having rolling engagement over said contact member in a path about said shaft at an angular rate equal to that of the rotation of said shaft.

4. An electric contact device comprising a rotatable shaft, a collector, an angle-drilled bushing on said shaft, said collector being rotatably mounted on said bushing, the axis of said collector being angularly disposed with respect to the axis of said shaft, a contact member positioned to contact said collector throughout relative movement therebetween, said collector having rolling engagement over said contact member in a path about said shaft at an angular rate equal to that of the rotation of said shaft, said contact member having a plurality of spaced electrical contacts mounted thereon in said path of contact.

5. An electric contact device comprising a shaft, a collector angularly attached to said shaft, a contact surface having its plane normal to the axis of said shaft and intersecting the plane of said collector at an edge thereof, and means for rotating said shaft whereby said collector precesses about the axis of said shaft in contact with said contact surface, said collector comprising a resilient electrically conductive disc having radial corrugations thereon whereby said disc expands slightly outwardly under contact pressure at points thereof engaging said contact member.

6. An electric contact device comprising a rotatable shaft, a collector rotatably attached to said shaft with its axis of rotation in misalignment with the axis of rotation of said shaft, a contact member having a plurality of contacts positioned for contact wtih said collector when said collector is precessed about said shaft on rotation thereof, a contact arm, a brush mounted on said collector and in constant resilient contact with said arm, said collector being electrically insulated from said shaft to thereby confine the electrical path from said arm to said contacts engaged by said collector.

References Cited in the file of this patent
UNITED STATES PATENTS

| 947,736 | Martin | Jan. 25, 1910 |
| 1,705,238 | Daloz | Mar. 12, 1929 |
| 2,312,980 | Root | Mar. 2, 1943 |
| 2,611,051 | Kolff | Sept. 16, 1952 |
| 2,665,343 | Benson | Jan. 5, 1954 |
| 2,698,884 | Breitenstein | Jan. 4, 1955 |
| 2,740,006 | Drugan | Mar. 27, 1956 |
| 2,744,972 | Davis | May 8, 1956 |

FOREIGN PATENTS

| 260,255 | Great Britain | June 27, 1957 |